Dec. 3, 1968 G. V. JACOBY 3,414,894

MAGNETIC RECORDING AND REPRODUCING OF DIGITAL INFORMATION

Filed June 29, 1965 3 Sheets-Sheet 1

INVENTOR.
GEORGE V. JACOBY
BY
Carl V. Olson
Attorney

INVENTOR.
GEORGE V. JACOBY
BY
Carl V. Olson
Attorney

Dec. 3, 1968 G. V. JACOBY 3,414,894

MAGNETIC RECORDING AND REPRODUCING OF DIGITAL INFORMATION

Filed June 29, 1965 3 Sheets-Sheet 3

INVENTOR.
GEORGE V. JACOBY
BY
Carl V. Olson
Attorney 3,414,894
Patented Dec. 3, 1968

3,414,894

MAGNETIC RECORDING AND REPRODUCING OF DIGITAL INFORMATION

George V. Jacoby, Bala-Cynwyd, Pa., assignor to Radio Corporation of America, a corporation of Delaware Filed June 29, 1965, Ser. No. 467,841
7 Claims. (Cl. 340—174.1)

ABSTRACT OF THE DISCLOSURE

A coder translates a conventional nonreturn-to-zero digital information signal to a signal in which there is a transition at the center of a bit cell representing a "1" and there is a transition at the boundary between bit cells representing two successive "0's." This signal is recorded on a magnetic medium. The signal later reproduced from the magnetic medium is applied to a decoder which extracts a timing wave from the signal and uses the timing wave to translate the signal back to a conventional nonreturn-to-zero signal. The decoder includes means to detect an information bit drop-out and generate an error signal.

This invention relates to systems for the magnetic recording and reproducing of digital information.

In an electronic computer or data processing apparatus, digital information is normally contained in, or passed through, registers. When information contained in a register is to be recorded on a magnetic medium, the information is gated from the register by clock or timing pulses. The resulting serial information signal is a simple nonreturn-to-zero signal having one level to represent a "0" and another level to represent a "1." This information signal may be recorded on, and reproduced from, a magnetic medium provided that the accompanying clock or timing information is also recorded on a separate track or on the same track with the "0" and "1" information signal. The information signal and the timing signal have been combined in various ways for recording on a single track. Such recorded self-clocking signals have, with a worst case information pattern, required at least two recorded transitions per information bit cell.

It is an object of this invention to provide a recording system in which a self-clocking signal is employed having, with a worst case information pattern, only one recorded transition per information bit cell.

It is another object to provide an improved system for translating signals obtained from registers to signals suited to recording on a magetic medium with high information density, and to reproduce the recorded signals and translate them to their original form.

It is a further object to provide an improved code converter for translating a simple nonreturn-to-zero information signal and accompanying timing pulse wave to a self-clocking signal in which a transition occurs in the middle of a bit cell to represent a "1" and a transition occurs between bit cells representing two successive "0's."

It is yet another object to provide an improved code converter for translating a self-clocking information signal, in which a transition occurs in the middle of a bit cell to represent a "1" and a transition occurs between bit cells representing two successive "0's," to a simple nonreturn-to-zero signal, an accompanying timing pulse wave and an error signal in the event of a "drop-out" of an information bit.

In accordance with an example of the invention, there is provided a system for the magnetic recording of a simple nonreturn-to-zero information signal having an accompanying timing pulse wave. Delay means cause the pulses of the timing pulse wave to occur during the second half of each bit cell of the information signal. First gate means is enabled by each "1" condition of the information signal to pass a timing pulse to the trigger input of a triggerable flip-flop. Second gate means is enabled by each "0" condition of the information signal to pass a timing pulse. Second delay means delays the timing pulse output of the second gate means an amount equal to one-half the period of a bit cell of the information signal. Third gate means is enabled by each "0" condition of the information signal to pass a delayed pulse from the second delay means to the trigger input of the triggerable flip-flop. The output of the triggerable flip-flop is a self-clocking information signal in which there is a transition to represent a "1" and a transition at the boundary between two successive "0's." The self-clocking information signal is recorded on a magnetic medium.

The self-clocking information signal, when reproduced or read from the magnetic medium, is applied to a timing extractor circuit to extract a timing pulse wave having a pulse occurring during the second half of each information bit cell. The reproduced self-clocking information signal is delayed about one-half of a bit cell period. Means enabled by pulses of the timing wave compares the second half of each reproduced information signal bit cell with the delayed information-indicating pulse wave, and provides a "same" output when they are the same, and a "different" output when they are different. The "same" output is coupled to one input of a flip-flop, and the "different" output is coupled to the other input of the flip-flop. The output of the flip-flop is a nonreturn-to-zero signal containing the information of the original nonreturn-to-zero signal. Information drop-out indicating means is coupled to receive the second timing wave, the "same" output and the "different" output, and to produce an alarm signal when neither a "same" signal nor a "different" signal appears at the time of a pulse of the second timing wave.

Figures 1, 2, 3:
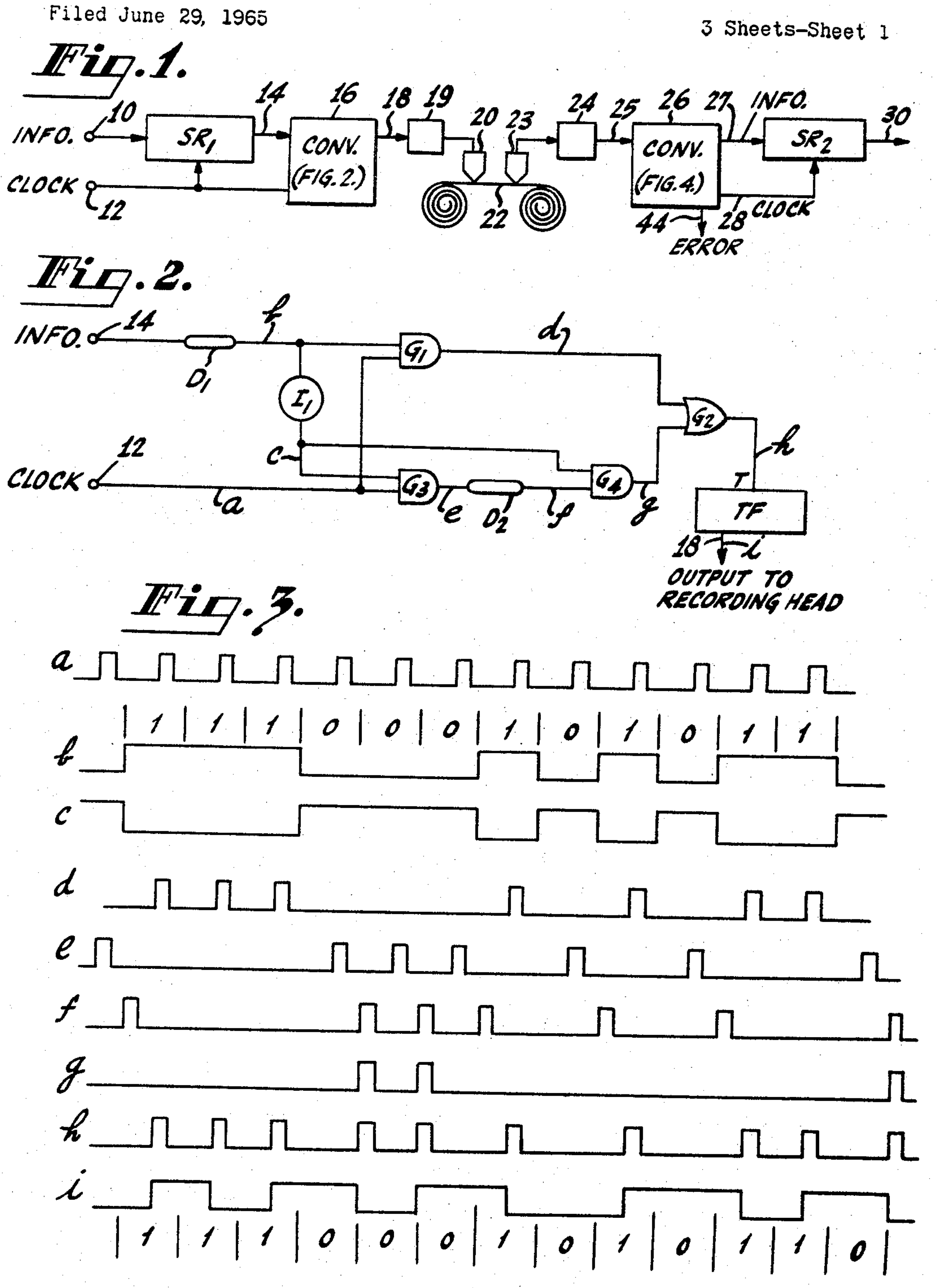
FIG. 1 is a block diagram of a magnetic recording and reproducing system according to the invention.
FIG. 2 is a diagram of a code converter forming a part of the system of FIG. 1.
FIG. 3 is a chart of voltage waveforms which will be referred to in describing the converter of FIG. 2.

Reference is now made in greater detail to the recording and reproducing system shown in FIG. 1. The system includes a shift register $SR_1$ to which information is supplied from an input terminal 10 and to which a clock or timing pulse wave is supplied from a terminal 12. The clock or timing wave supplies shift pulses to the shift register $SR_1$ and causes it to supply serial information bits over line 14 to a converter 16. The converter 16, which will be described in detail in connection with FIGS. 2 and 3, utilizes the input timing wave to convert the nonreturn-to-zero information signal to a self-clocking information signal on output lead 18. The self-clocking signal is applied through a write circuit 19 to a magnetic recording head 20 by means of which the signal is recorded on a moving magnetic medium 22.

The recorded signal is later reproduced from the recording medium 22 by a magnetic head 23 from which the signal is applied through amplifier and equalizer circuits 24 to the input 25 of a converter 26. The converter 26, which will be described in detail in connection with FIGS. 4 and 5, supplies a serial nonreturn-to-zero information signal over line 27 to a shift register $SR_2$. The converter 26 also supplies a shift pulse wave over line 28 to the shift register $SR_2$ so that the information in the shift register is made available on the output line 30.

The system shown in FIG. 1 is one in which a simple nonreturn-to-zero information signal is translated to a self-clocking signal in which a transition occurs at the middle of a bit cell representing a "1" and a transition occurs between bit cells representing two successive "0's." The self-clocking signal is one adapted for recording on the recording medium 22 with relatively high information density. The system of FIG. 1 is also one in which the self-clocking information signal reproduced or read from the magnetic medium is translated back to a nonreturn-to-zero signal suitable for application to a conventional shift register.

Reference is now made to FIGS. 2 and 3 for a detailed description of the converter 16 in FIG. 1. The converter of FIG. 2 receives a nonreturn-to-zero information signal on input terminal 14 and receives an accompanying timing pulse wave on input terminal 12. The received timing wave on input terminal 12 is as represented in FIG. 3*a*. The received information signal at terminal 14 is delayed by a delay unit $D_1$ to provide a delayed nonreturn-to-zero information signal as shown in FIG. 3*b*. The information signal is illustrated, by way of example, as conveying the digital information 111000101011. The pulses of the timing wave of FIG. 3*a* occur during the second halves of indicated information bit cells of the information wave of FIG. 3*b*.

The delayed information signal of FIG. 3*b* is applied to a gate $G_1$ which is enabled by timing pulses of FIG. 3*a* to produce at its output the information-indicating pulse wave of FIG. 3*d*. Gate $G_1$, and all other similarly-represented gates to be described, are conventional "and" gates. Other types of gates may, of course, be employed provided that appropriate attention is given to the polarities of the signals involved and the basic functions performed by the gates.

The output of gate $G_1$ is applied through an "or" gate $G_2$ to the trigger input T of a triggerable flip-flop TF. The portion of the converter thus far described acts to trigger the triggerable flip-flop TF to provide a transition at its output 18 every time there is a "1" information bit in the input signal applied to input terminal 14.

The delayed input signal of FIG. 3*b* is applied through an inverter $I_1$ to produce a delayed and inverted signal as shown in FIG. 3*c*. This signal is applied to a gate $G_3$, which is enabled by pulses of the timing wave of FIG. 3*a*, to produce information-indicating pulses as shown in FIG. 3*e*. This pulse wave is delayed in delay unit $D_2$ an amount equal to one-half of an information bit cell to produce a pulse wave as shown in FIG. 3*f*. The wave of FIG. 3*f* and the inverted information signal of FIG. 3*c* from inverter $I_1$ are applied to a gate $G_4$. The output of gate $G_4$ is as represented in FIG. 3*g* and is applied through "or" gate $G_2$ to the trigger input T of triggerable flip-flop TF. The pulses of FIG. 3*g* from gate $G_4$ combine with the pulses of FIG. 3*d* from gate $G_1$ to produce at the output of "or" gate $G_2$ the pulse wave of FIG. 3*h*. Each pulse of the wave of FIG. 3*h* produces a transition in the output 18 shown in FIG. 3*i* of the triggerable flip-flop TF.

This output wave as shown in FIG. 3*i* is a self-clocking information signal in which a transition occurs at the middle of each bit cell representing a "1" and a transition occurs at the boundray between two successive bit cells containing "0's." The self-clocking waveform of FIG. 3*i* is adapted for recording on a magnetic medium with a very high information density per unit length of magnetic medium. The high information density results from the fact that a worst-case information pattern, all "1's" or all "0's," involves only one recording transition per information bit cell.

Figure 4:
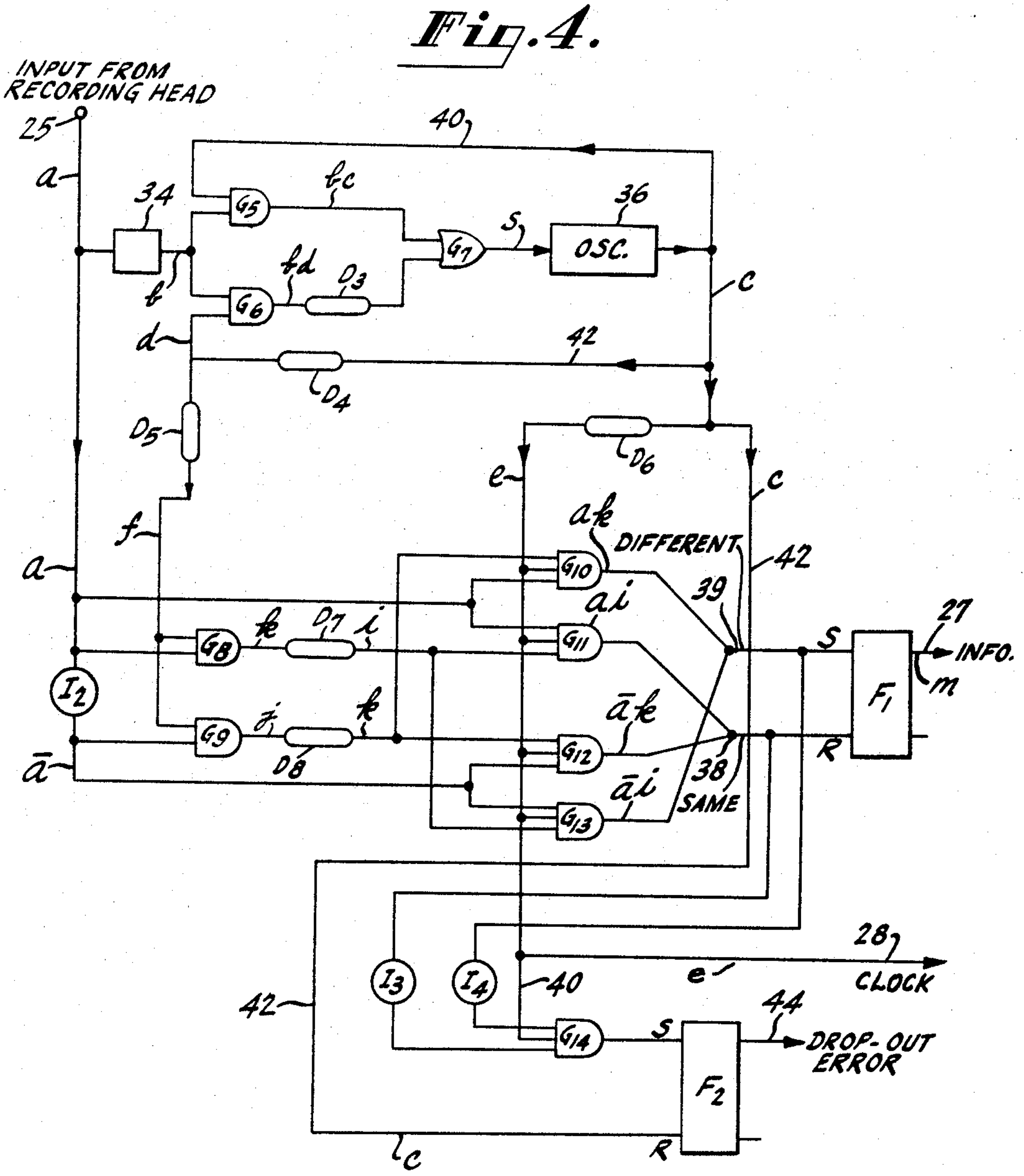
FIG. 4 is a diagram of a second code converter also forming a part of the system of FIG. 1.
Figure 5:
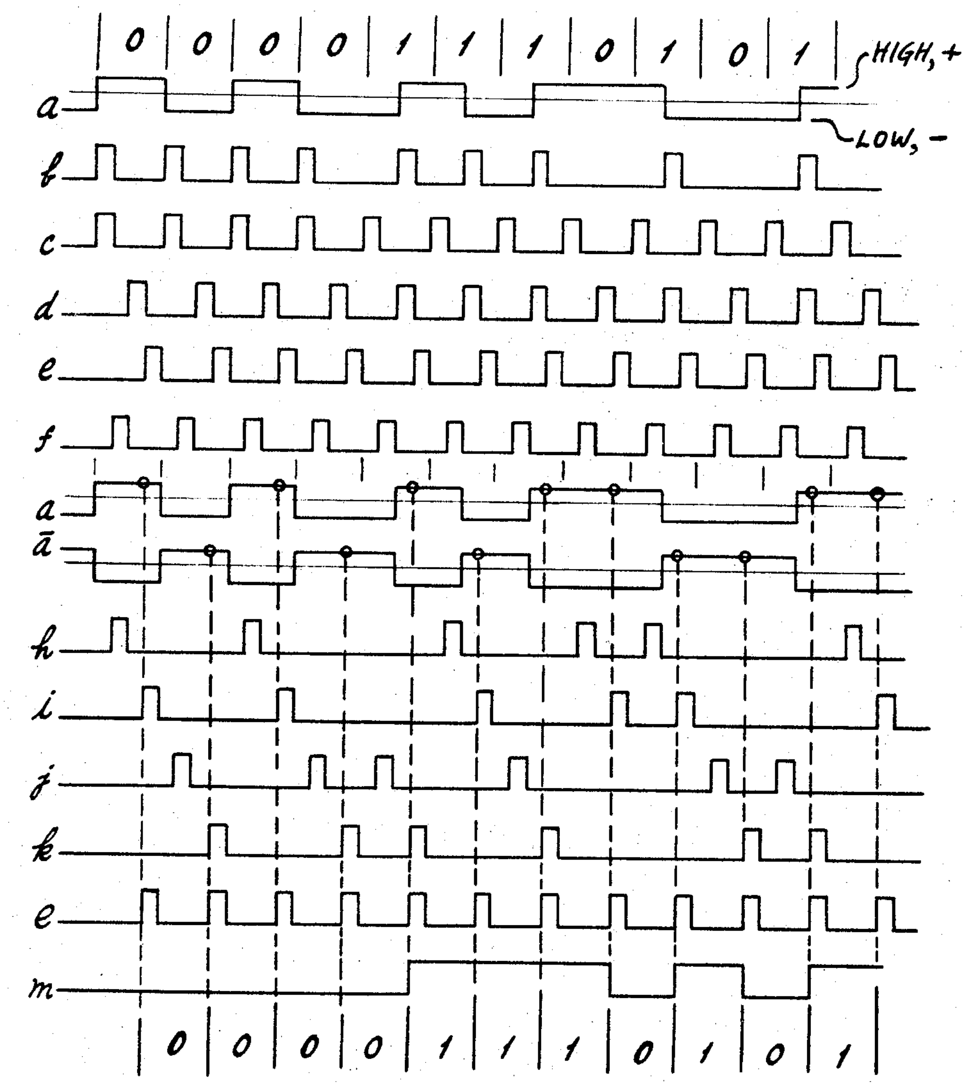
FIG. 5 is a chart of voltage waveforms which will be referred to in describing the converter of FIG. 4.

Reference is now made to FIGS. 4 and 5 for a detailed description of the converter 26 in FIG. 1 which translates the self-clocking signal read from the magnetic medium to a nonreturn-to-zero signal suitable for application to a conventional shift register. The self-clocking information signal applied to input terminal 25 is as shown in FIG. 5*a* when, for example, the digital information consists of 00001110101. The reproduced information signal is applied to a pulse generating circuit 34 providing an output, as shown in FIG. 5*b*, wherein a pulse is present for every transition of the input wave of FIG. 5*a*. The pulse wave of FIG. 5*b* is applied through a gate $G_5$ and through an "or" gate $G_7$ to the synchronizing input S of an oscillator 36. The pulse wave of FIG. 5*b* is also applied through a gate $G_6$, a delay unit $D_3$ and the "or" gate $G_7$ to the synchronizing input S of oscillator 36. Delay unit $D_3$ provides a delay equal to one-half of a bit cell period. The output of oscillator 36, as shown in FIG. 5*c*, is fed back over line 40 to the input of gate $G_5$, and is fed back over line 42 and a delay unit $D_4$ to an input of gate $G_6$. Delay unit $D_4$ provides a delay equal to one-half of a bit cell period. The output of delay unit $D_4$ is as shown in FIG. 5*d*.

The oscillator feedback loop including line 40 and gate $G_5$ insures the application of a synchronizing pulse to the oscillator every time there is a transition at the boundary of bit cells of the input signal. The second feedback loop including the line 42, delay unit $D_4$, gate gate $G_6$ and delay unit $D_3$ insures the application of a synchronizing pulse to the oscillator 36 every time there is a transition in the center of a bit cell of the input signal. In this way, synchronization of the oscillator 36 is established and maintained regardless of the pattern of "1" and "0" information bits in the input signal. The proper phase of the oscillator 36 is initially established by the employment of a preamble, consisting of a series of "0's," preceding each information message. Once the phase of the oscillator is established by the preamble, the oscillator remains in synchronism and phase during the following information portion of the entire message.

The output of oscillator 36 is applied through a delay unit $D_6$ to provide a "second" timing wave as shown in FIG. 5*e*. The delay unit $D_6$ provides a delay equal to three-fourths of a bit cell period. The pulses of the "second" timing wave occur during the second half of each information bit cell of the input signal. The output of the oscillator is also delayed by delay unit $D_4$ and $D_5$ to provide a "first" timing pulse wave as shown in FIG. 5*f*. The delay unit $D_5$ provides a delay equal to three-fourths of a bit cell period. The "first" timing pulse wave contains pulses which occur during the first half of each information bit cell of the input information signal. The portion of the converter of FIG. 4 as thus far described constitutes a timing extraction circuit by means of which a "first" timing wave of FIG. 5*f* and a "second" timing wave of FIG. 5*e* are extracted from the input information signal for use in the code converting portion of the converter now to be described.

The input information signal from input terminal 25 is applied to a gate $G_8$, and is applied through an inverter $I_2$ to a gate $G_9$. The information signals applied to gates $G_8$ and $G_9$ are as shown in FIGS. 5*a* and $5\bar{a}$, respectively. Gates $G_8$ and $G_9$ are enabled by the "first" timing wave of FIG. 5*f* to produce respectively information-indicating pulse waves as shown in FIGS. 5*h* and 5*j*. These pulse waves are delayed one-half of a bit cell period by respective delay devices $D_7$ and $D_8$ to provide the respective delayed information-indicating pulse waves of FIGS. 5*i* and 5*k*, respectively.

The output of delay unit $D_7$ is connected to gates $G_{11}$ and $G_{13}$. The output of delay unit $D_8$ is connected to gates $G_{10}$ and $G_{12}$. The input signal from terminal 25 is connected to gates $G_{10}$ and $G_{11}$, and the inverted input signal from inverter $I_2$ is connected to gates $G_{12}$ and $G_{13}$. All of gates $G_{10}$ through $G_{13}$ also receive enabling pulses of the "second" timing wave of FIG. 5*e* from delay unit $D_6$.

The outputs of gates $G_{10}$ and $G_{13}$ are connected to the set input S of a flip-floy $F_1$. The outputs of gates $G_{11}$ and $G_{12}$ are connected to the reset input R of the flip-flop $F_1$. The output 27 from flip-flop $F_1$ provides the nonreturn-to-zero output signal shown in FIG. 5*m*. The output line 28 carries the clock or timing pulse wave of FIG. 5*e*.

The pulse waves of FIGS. 5*i* and 5*k* from delay units $D_7$ and $D_8$ represent the first half of each information bit cell of the input information signal. These signals representing the first half of each input information bit cell are compared in gates $G_{10}$ through $G_{13}$ with the input information signal during the second half of each information bit cell as sampled by the "second" timing pulse wave of FIG. 5*e*. The gates are connected to produce a "same" output at 38 which resets flip-flop $F_1$ when the first and second halves of an input signal bit cell are the same. Gates $G_{10}$ and $G_{13}$ are connected to produce a "different" output at 39 which sets flip-flop $F_1$ when the first and second halves of an input signal bit cell are different. In other words, the system detects a transition at the middle of an input signal bit cell, if present, and sets flip-flop $F_1$ to provide an output level at 27 indicating a "1." If the system detects no transition at the center of an input signal bit, cell, the flip-flop $F_1$ is reset so that its output at 27 has a level indicating a "0." The output at 27 from the flip-flop $F_2$ is thus simple nonreturn-to-zero information signal as shown in FIG. 5*m*.

An information drop-out indicating circuit includes an inverter $I_3$ connected from the "same" output 38 of gates $G_{11}$ and $G_{12}$ through a gate $G_{14}$ to the set input S of a flip-flop $F_2$. An inverter $I_4$ is connected from the "different" output 39 of gates $G_{10}$ and $G_{13}$ through the gate $G_{14}$ to the set input S of flip-flop $F_2$. The gate $G_{14}$ is enabled by an input 40 carrying pulses of the "second" timing wave of FIG. 5*e*. The output of oscillator 36 is connected over a line 42 to the reset input R of flip-flop $F_2$.

In the operation of the information drop-out indicating means, the flip-flop $F_2$ is reset by every pulse of FIG. 5*c* from the oscillator 36. Gate $G_{14}$ is enabled during the time of a following pulse of the "second" timing wave of FIG. 5*e* by a signal through inverters $I_3$ and $I_4$ if neither a set pulse nor a reset pulse is applied to flip-flop $F_1$. Stated another way, the flip-flop $F_2$ is set to provide a drop-out error signal at its output 44 if there is neither a "same" output from gate $G_{11}$ or gate $G_{12}$ nor a "different" output from gate $G_{10}$ or gate $G_{13}$. Gate $G_{11}$ provides a "same" output when the first and second halves of an input bit cell are both high. Gate $G_{12}$ provides a "same" output when the first and second halves of a bit cell are both low. Gate $G_{10}$ provides a "different" output when the first half is low and the second half is high. Gate $G_{13}$ provides a "different" output when the first half is high and the second half is low.

However, no one of the gates $G_{10}$ through $G_{13}$ provides an output if the first half, or the second half, or both halves of an input signal bit cell has or have an intermediate value between the "high" value and the "low" value. A so-called "low" value signal input to a gate is a positive signal obtained by inversion in inverter $I_2$. The desired response characteristic may be achieved by using gates $G_8$ through $G_{13}$ which respond to signals exceeding a given threshold and which do not respond to signals having an "intermediate" value below the threshold. Then, if a signal read from the magnetic medium has a portion of intermediate value between "high" and "low" due to an imperfection in the recording medium, there will be an absence of either a "same" or a "different" output from gates $G_{10}$ through $G_{13}$ and a "drop-out error signal will be generated at the output 44 of flip-flop $F_2$. The system is therefore capable of giving an alarm on the occurrence of an error resulting from a failure to reproduce a part of, or all of, an information bit cell such as may be due to an imperfection in the recording medium.

I claim:

1. A system for the magnetic recording and reproducing of a simple nonreturn-to-zero information signal having an accompanying timing pulse wave, comprising:

first converter means utilizing said timing pulse wave to translate said information signal to a self-clocking information signal in which a transition occurs in the middle of a bit cell to represent a "1" and a transition occurs between bit cells representing two successive "0's,"

means to record said self-clocking information signal on a magnetic medium, means to reproduce said self-clocking information signal from said magnetic medium, timing extraction means to extract a timing pulse wave from said reproduced information signal, second converter means utilizing said extracted timing pulse wave to translate said reproduced information signal back to a simple nonreturn-to-zero signal, and information drop-out indicating means coupled to said timing extraction means and said second converter means to generate an error signal when said converter means fails to identify two successive portions of the reproduced information signal as being either the same or different.

2. A system for the magnetic recording and reproducing of a simple nonreturn-to-zero information signal having an accompanying clock pulse wave, comprising:

a triggerable flip-flop, first gate means enabled by each "1" condition of said nonreturn-to-zero signal to pass a timing pulse to the trigger input of said triggerable flip-flop, second gate means enabled by each "0" condition of said nonreturn-to-zero signal to pass a timing pulse, delay means to delay the timing pulse output of said second gate means an amount equal to one-half the period of a bit cell of said nonreturn-to-zero signal, and third gate means enabled by each "0" condition of said nonreturn-to-zero signal to pass a delayed pulse from said delay means to the trigger input of said triggerable flip-flop, whereby the output of said triggerable flip-flop is a self-clocking information signal in which there is a transition in the middle of a bit cell to represent a "1" and a transition at the boundary between two successive "0's,"

means to record said self-clocking information signal on a magnetic medium, means to reproduce said self-clocking information signal from said magnetic medium, timing extraction means to extract a timing pulse wave from said reproduced information signal, and converter means utilizing said extracted timing pulse wave to translate said reproduced information signal back to a simple nonreturn-to-zero signal.

3. A system as defined in claim 2, and in addition, an information drop-out indicating means coupled to said timing extraction means and said converter means to generate an error signal.

4. A system for the magnetic recording and reproducing of a simple nonreturn-to-zero information signal having an accompanying timing pulse wave, comprising:

means utilizing said timing pulse wave to translate said information signal to a self-clocking information signal in which a transition occurs in the middle of a bit cell to represent a "1" and a transition occurs between bit cells representing two successive "0's,"

means to record said self-clocking information signal on a magnetic medium, means to reproduce said self-clocking information signal from said magnetic medium, means to extract a timing pulse wave from said reproduced information signal, means to extract from said reproduced signal a first timing wave having a pulse occurring during the first half of each reproduced signal bit cell and a second timing wave having a pulse occurring during the second half of each reproduced signal bit cell, gate means receptive to said reproduced signal and enabled by pulses of said first timing wave to produce an information-indicting pulse wave, delay means providing a delay about one-half of a bit cell period coupled to the output of said gate means to produce a delayed information-indicating pulse wave, means enabled by pulses of said second timing wave to compare the second half of each reproduced signal bit cell with the delayed information-indicating pulse wave then representing the first half of the respective reproduced signal bit cell and to provide a "same" output when they are the same, and a "different" output when they are different, a flip-flop having one input coupled to received said "same" output and having another input coupled to receive said "different" output, whereby the output of said flip-flop is a simple nonreturn-to-zero signal containing the information of said reproduced signal, and information drop-out indicating means coupled to receive said second timing wave, said "same" output and said "different" output, and to produce an alarm signal when neither a "same" signal nor a "different" signal appears at the time of a pulse of said second timing wave.

5. A system for the magnetic recording and reproducing of a simple nonreturn-to-zero information signal having an accompanying timing pulse wave, comprising:

first delay means to cause the pulses of said timing pulse wave to occur during the second half of each bit cell of the information signal, a triggerable flip-flop, first gate means enabled by each "1" condition of said information signal to pass a timing pulse to the trigger input of said triggerable flip-flop, second gate means enabled by each "0" condition of said information signal to pass a timing pulse, second delay means to delay the timing pulse output of said second gate means an amount equal to one-half the period of a bit cell of said information signal, third gate means enabled by each "0" condition of said information signal to pass a delayed pulse from said second delay means to the trigger input of said triggerable flip-flop, whereby the output of said triggerable flip-flop is a self-clocking information signal in which there is a transition in the middle of a bit cell to represent a "1" and a transition at the boundary between two successive "0's,"

means to record said self-clocking information signal on a magnetic medium, means to reproduce said self-clocking information signal from said magnetic medium, means to extract from said reproduced self-clocking information signal a timing pulse wave having a pulse occurring during the second half of each information bit cell, means to translate said reproduced self-clocking information signal to a delayed information-indicating pulse wave delayed about one-half of a bit cell period relative to the reproduced self-clocking information signal, means enabled by pulses of said timing wave to compare the second half of each reproduced information signal bit cell with the delayed information-indicating pulse wave then representing the first half of the respective reproduced information signal bit cell and to provide a "same" output when they are the same, and a "different" output when they are different, a flip-flop having one input coupled to received said "same" output and having another input coupled to receive said "different" output, whereby the output of said flip-flop is a nonreturn-to-zero signal containing the information of said original nonreturn-to-zero signal, and information drop-out indicating means coupled to receive said second timing wave, said "same" output and said "different" output, and to produce an alarm signal when neither a "same" signal nor a "different" signal appears at the time of a pulse of said second timing wave.

6. A code converter utilizing a simple nonreturn-to-zero information input signal and an accompanying timing wave having a pulse occurring during the second half of each bit cell of the input signal, comprising:

a triggerable flip-flop, first gate means enabled by each "1" condition of said input signal to pass a timing pulse to the trigger input of said triggerable flip-flop, second gate means enabled by each "0" condition of said input signal to pass a timing pulse, delay means to delay the timing pulse output of said second gate means an amount equal to one-half the period of a bit cell of said input signal, and third gate means enabled by each "0" condition of said input signal to pass a delayed pulse from said delay means to the trigger input of said triggerable flip-flop, whereby the output of said triggerable flip-flop is a self-clocking information signal in which there is a transition in the middle of a bit cell to represent a "1" and a transition at the boundary between two successive "0's,"

7. A code converter utilizing a slf-clocking input information signal in which a transition occurs in the middle of a bit cell representing a "1" and a transition occurs between bit cells representing two successive "0's," comprising:

means to extract from said input signal a first timing wave having a pulse occurring during the first half of each input bit cell and a second timing wave having a pulse occurring during the second half of each input bit cell, gate means receptive to said input signal and enabled by pulses of said first timing wave to produce an information-indicating pulse wave, delay means providing a delay of about one-half of a bit cell period coupled to the output of said gate means to produce a delayed information-indicating pulse wave, means enabled by pulses of said second timing wave to compare the second half of each input signal bit cell with the delayed information-indicating pulse wave then representing the first half of the respective input signal bit cell and to provide a "same" output when they are the same, and a "different" output when they are different, a flip-flop having one input coupled to receive said "same" output and having another input coupled to receive said "different" output, whereby the output of said flip-flop is a simple non-return-to-zero signal containing the information of said input signal, and information drop-out indicating means coupling to receive said second timing wave, said "same" output and said "different" output, and to produce an alarm signal when neither a "same" signal nor a "different" signal appears at the time of a pulse of said second timing wave.

References Cited

UNITED STATES PATENTS

| | | | |
|---|---|---|---|
| 3,323,115 | 5/1967 | Sims | 340—174.1 |
| 3,264,623 | 8/1966 | Gabor | 340—174.1 |
| 3,237,176 | 2/1966 | Jenkins | 340—174.1 |
| 3,235,855 | 2/1966 | Woo | 346—74 |
| 2,807,004 | 9/1957 | Pouliart et al. | 340—174.1 |

BERNARD KONICK, *Primary Examiner.*

A. I. NEUSTADT, *Assistant Examiner.*